(12) United States Patent
Hlebarov et al.

(10) Patent No.: US 10,758,837 B2
(45) Date of Patent: Sep. 1, 2020

(54) SOLAR-POWERED DESALINATION SYSTEM

(71) Applicant: Epicuro Ltd, London (GB)

(72) Inventors: Vejen Hlebarov, Epsom (GB); Denis Chamberlain, Alnwick (GB); Robert Davidson Binns, Gloucestershire (GB)

(73) Assignee: Epicuro Ltd, London (GB)

( * ) Notice: Subject to any disclaimer, the term of this patent is extended or adjusted under 35 U.S.C. 154(b) by 0 days.

(21) Appl. No.: 15/571,840

(22) PCT Filed: May 5, 2016

(86) PCT No.: PCT/GB2016/051284
§ 371 (c)(1),
(2) Date: Nov. 5, 2017

(87) PCT Pub. No.: WO2016/178021
PCT Pub. Date: Nov. 10, 2016

(65) Prior Publication Data
US 2018/0133616 A1    May 17, 2018

(30) Foreign Application Priority Data

May 5, 2015 (GB) .................................. 1507689.6

(51) Int. Cl.
*C02F 1/18* (2006.01)
*C02F 1/14* (2006.01)
(Continued)

(52) U.S. Cl.
CPC ......... *B01D 1/0035* (2013.01); *B01D 1/0082* (2013.01); *B01D 5/006* (2013.01);
(Continued)

(58) Field of Classification Search
CPC .. B01D 1/0035; C02F 1/14; C02F 1/18; F24S 2023/833; F24S 23/71; F24S 10/50
See application file for complete search history.

(56) References Cited

U.S. PATENT DOCUMENTS 3,775,257 A * 11/1973 Lovrich .................... C02F 1/14
                                                                   202/234
4,034,737 A * 7/1977 Kume ...................... G02B 5/10
                                                                   126/603

(Continued)

FOREIGN PATENT DOCUMENTS

GR      1004202 B     4/2003

OTHER PUBLICATIONS

Gilliquet, J, "International Search Report", prepared for application No. PCT/GB2016/051284, dated Jul. 13, 2016, 3 pages.

*Primary Examiner* — Jonathan Luke Pilcher
(74) *Attorney, Agent, or Firm* — Winstead PC

(57) ABSTRACT

The invention provides a desalination system comprising: a controller; a salt water tank operable to receive salt water therein; a solar collector in fluid communication with the salt water tank and adapted to receive salt water therein; a first pump operable to pump salt water from the salt water tank into the solar collector; a photovoltaic (PV) panel operable to convert incident solar energy to electrical energy, and operable to supply electrical energy to the first pump; a water condenser tank in fluid communication with the first pump and arranged to receive water vapour from the solar collector and to condense such received water vapour; and a temperature detector operable to generate a temperature signal indicative of a temperature of the solar collector, and to supply such a temperature signal to the controller, wherein the controller is arranged to receive a temperature signal from the temperature detector, and is operable to control the first pump in dependence upon such a received temperature (Continued)

signal, such that the first pump operates to transfer saltwater from the saltwater tank to the solar collector when the temperature signal is indicative of a predetermined temperature.

19 Claims, 6 Drawing Sheets

(51) Int. Cl.
*B01D 1/00* (2006.01)
*B01D 5/00* (2006.01)
*C02F 1/00* (2006.01)
*C02F 103/08* (2006.01)

(52) U.S. Cl.
CPC ............... *C02F 1/008* (2013.01); *C02F 1/14* (2013.01); *C02F 1/18* (2013.01); *C02F 2103/08* (2013.01); *C02F 2201/009* (2013.01); *C02F 2209/40* (2013.01); *C02F 2209/42* (2013.01); *C02F 2209/44* (2013.01); *Y02A 20/128* (2018.01); *Y02A 20/129* (2018.01); *Y02A 20/142* (2018.01); *Y02A 20/212* (2018.01)

(56) References Cited

U.S. PATENT DOCUMENTS

| | | | |
|---|---|---|---|
| 4,276,122 A | 6/1981 | Snyder | |
| 5,348,622 A * | 9/1994 | Deutsch | B01D 3/42 202/176 |
| 6,630,622 B2 * | 10/2003 | Konold | F24S 23/31 136/246 |
| 2008/0164135 A1 | 7/2008 | Slook | |
| 2010/0314238 A1 * | 12/2010 | Frolov | B01D 1/0047 203/10 |
| 2012/0067338 A1 * | 3/2012 | Funcheon | B01D 1/0035 126/602 |

* cited by examiner

SOLAR-POWERED DESALINATION SYSTEM

The present invention relates to a solar-powered desalination system and a method of solar powered desalination using such a system.

According to statistics provided by the United Nations, of the world's water, 97.5% is oceanic salt water and 2.5% is fresh water. Of this 2.5% fresh water, approximately 69% is frozen in glaciers and ice caps, leaving approximately 30% as groundwater and approximately 1% as swamps.

Desalination, also known as desalinisation and desalting, is the process of removing dissolved salts from water, thus producing fresh water from seawater or brackish water. Desalting technologies are used mainly to produce potable water from saline water for domestic or municipal purposes. Use of desalination and desalination technologies for industrial applications is also growing, especially in the oil and gas industry.

In some economically disadvantaged regions over-extraction of fresh ground water is leading to ground water contamination which is posing a threat to sustainability. Therefore provision of fresh water using desalination technologies is of particular interest in such regions. However, it is important to understand that a regular electricity supply is scarce and acid batteries are expensive and have a finite life, so are not especially suitable for continuous, reliable desalination. In addition, as such regions are often remote and have poor road infrastructures and motor vehicles are a premium, therefore the transportation and assembly of a desalination plant can be problematic.

There is therefore a need for a compact, reliable, easily transportable desalination system that does not rely on a national power infrastructure.

The present invention seeks to address the problems of the prior art.

Accordingly, the present invention provides a desalination system comprising: a controller; a salt water tank operable to receive salt water therein; a solar collector in fluid communication with the salt water tank and adapted to receive salt water therein; a first pump operable to pump salt water from the salt water tank into the solar collector; a photovoltaic (PV) panel operable to convert incident solar energy to electrical energy, and operable to supply electrical energy to the first pump; a water condenser tank in fluid communication with the first pump and arranged to receive water vapour from the solar collector and to condense such received water vapour; and a temperature detector operable to generate a temperature signal indicative of a temperature of the solar collector, and to supply such a temperature signal to the controller, wherein the controller is arranged to receive a temperature signal from the temperature detector, and is operable to control the first pump in dependence upon such a received temperature signal, such that the first pump operates to transfer saltwater from the saltwater tank to the solar collector when the temperature signal is indicative of a predetermined temperature.

Preferable, the predetermined temperature at the plates of the solar collector is at or above 90° C.

In this way, the system will feed salt water to the solar collector after it has reached a predetermined temperature, avoiding the situation where salt water is being drip-fed to the solar collector before the plates of the solar collector are at a temperature sufficient to begin the vapourisation process. It is to be appreciated that during operation, if the temperature signal drops below a predetermined temperature i.e. the temperature at the solar collector drops below the predetermined temperature, the controller will not act to operate the first pump and thus no salt water will be transferred to the solar collector. This avoids the system expending unnecessary energy on operating the pump when the solar collector is at a temperature insufficient to support vapourisation.

In one embodiment, the system is further provided with a clean water tank in fluid communication with the water condenser tank and operable to collect condensed water therefrom. Alternatively, the clean water may be output from the water condenser tank into a tank or container external to the system via pipes, tubing or other appropriate conduit.

In a further embodiment, the system is further provided with a second pump in fluid communication with the condenser and the clean water tank and operable to pump water from the water condenser tank to the clean water tank on receipt of a signal from the controller. However, in the event that the clean water tank is positioned at a lower level than the output of the condenser, then the clean water may be fed into the clean water tank (or external tank or container) by means of gravity with or without the assistance of a pump to facilitate water movement.

The system may further comprise a first sensor located in the water condenser tank and operable to transmit a signal to the controller on detection of water. Thus the controller is informed when a predetermined amount of water is available for removal from the water condenser tank. The placement of the sensor within the water condenser tank is carefully selected to indicate the level that has been reached by the condensed clean water. The water can then be removed from the water condenser tank.

In one embodiment, on receipt of a signal from the first sensor, the controller is operable to transmit a signal to the second pump to pump clean water from the water condenser tank to the clean water tank. In this way, the collection of clean water from the water condenser tank is automated and the pump is only active when the clean water level has reached a predetermined level within the water condenser tank.

The system may further comprise a reflector operable to direct solar rays onto the solar collector. The solar reflector is used to increase the solar energy intensity on the solar collector, thereby facilitating the heating of the plates in the solar collector to a temperature suitable for vapourisation of water and the retention of such a temperature at the plates after the vapourisation process is underway.

Preferably, the reflector and solar collector are pivotable relative to one another between a first folded configuration and a second expanded configuration. This permits the reflector and solar collector arrangement to be folded for storage or transportation, thereby protecting both components from damage. However, when required for use, the reflector is simply unfolded to its expanded configuration where the reflector can be positioned to direct solar rays onto the solar collector.

Preferably, in the second expanded configuration the reflector and solar collector are arranged in a fixed position relative to one another to maximise the reflection of solar rays by the reflector onto the surface of the solar collector. However, it will be appreciated that the position of the reflector may be adjusted to alter the angle between the reflector and solar collector if desired by including a conventional adjustment mechanism to hold the reflector in position at a selection of angles relative to the solar collector.

The angle of the reflector relative to the solar collector may be set for optimal performance for the time of year, according to the location of use. In one embodiment, this may be set by a mechanical stop on the desalination system, which can be reset to alter the angle to re-optimise for each change of time and/or place where the desalination system is to be operated.

A desalination system as claimed in any preceding claim, wherein the solar collector is mounted on a movable platform. The movable platform may be any suitable movable platform known to the skilled person.

Preferably, the moveable platform is operable to move the solar collector about a vertical axis. This allows the solar collector to follow the movement of the sun over time.

In one embodiment, the system further comprises a plurality of photodetectors operable to generate a solar energy signal indicative of solar energy, and to supply such a solar energy signal to the controller, wherein the controller is arranged to receive solar energy signals from the photodetectors and is operable to control the movable platform in dependence upon such received solar energy signals, such that the movable platform is operable to move the solar collector about a vertical axis.

Preferably, on receipt of solar energy signals from the photodetectors, the controller is operable to calculate an optimum position for the solar collector and is operable to control the movable platform in dependence upon the optimum position, such that the moveable platform is operable to move the solar collector about the vertical access to a position corresponding to the optimum position. This ensures that the solar collector and reflector are positioned in a suitable orientation to receive solar rays from the sun to heat the panels in the solar collector.

In a further embodiment, the controller is operable at preselected time intervals to receive solar energy signals from the photodetectors and calculate a new optimum position for the solar collector and is operable to control the moveable platform in dependence upon the new optimum position, and is operable to control the movable platform in dependence upon the new optimum position, such that the moveable platform is operable to move the solar collector about the vertical access to a position corresponding to the new optimum position. This automated movement of the platform over time in response to each new optimum position ensures that the solar collector tracks the sun's movement across the sky in order to maximise the exposure of the reflector to solar rays.

The system may be further provided with a second sensor located in the clean water tank and operable to transmit a signal to the controller on detection of the clean water rising above a predetermined level. Preferably, the predetermined level indicates that the clean water tank is full or almost full. Thus, there is an indication when the tank requires emptying.

The system may be further provided with a third sensor located in the salt water tank and operable to transmit a signal to the controller on detection of the salt water level dropping below a predetermined level. Preferably, the predetermined level indicates that the salt water tank is empty or almost empty and requires filling.

Preferably, on detection of a signal from one or both of the second or third sensors, the controller is operable to transmit a signal to the pumps to cease operating. This ensures that the pumps are not operated when the clean water tank is full or almost full and/or when the salt water tank is empty or almost empty. This ensures that energy is not expended unnecessarily.

The desalination system may be further provided with a battery pack in electrical communication with the photovoltaic panel.

The electrical components of the desalination system may be powered by the photovoltaic panel, the batter pack or a combination of the two. Preferably, the electrical components are powered by the photovoltaic panel, which will also charge the battery pack when the photovoltaic panel is generating sufficient electrical energy. Any shortfall in electrical energy to power the electrical components of the desalination system may be supplied by the battery pack which acts as a back-up power source. Further, the battery pack may be used as a back-up power source on initialisation of the desalination system and when the desalination system is in stand-by mode.

BRIEF DESCRIPTION OF THE DRAWINGS

An embodiment of the invention will now be described, by way of example only, and with reference to the accompanying drawings, in which.

The embodiment shown in the figures will now be discussed with reference to all figures. The same figure references have been used in each figure to indicate the same features of the invention.

Figure 1:
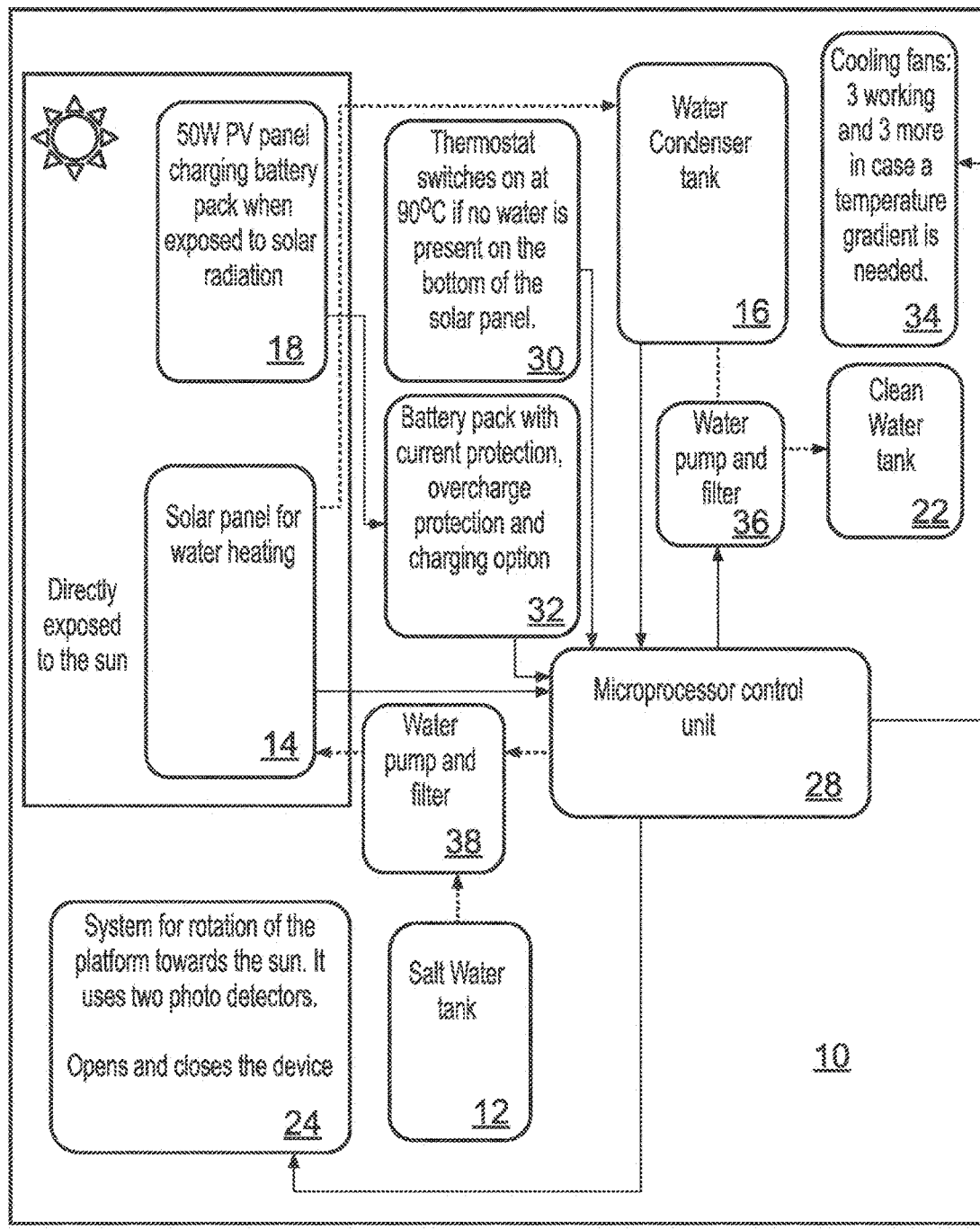
FIG. 1 is a process diagram showing the intercommunication between component parts of a desalination system in accordance with a first embodiment of the present invention.

FIG. 1 is a diagram of the desalination system process. The blue arrows indicate the electrical connections between components and the red arrows indicate the path of the water as it progresses through the desalination process. The electrical connections shown are schematic and indicate functions rather than constructional detail.

Figure 2:
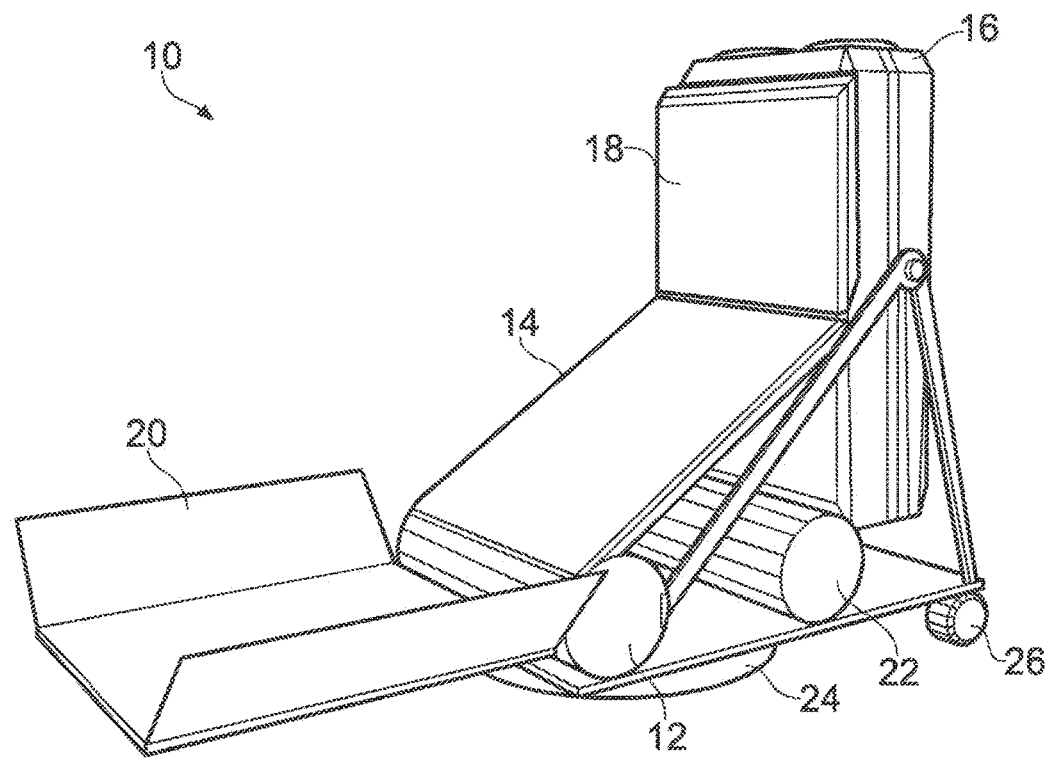
FIG. 2 is a perspective view of a desalination system in accordance with a first embodiment of the present invention.
Figure 3:
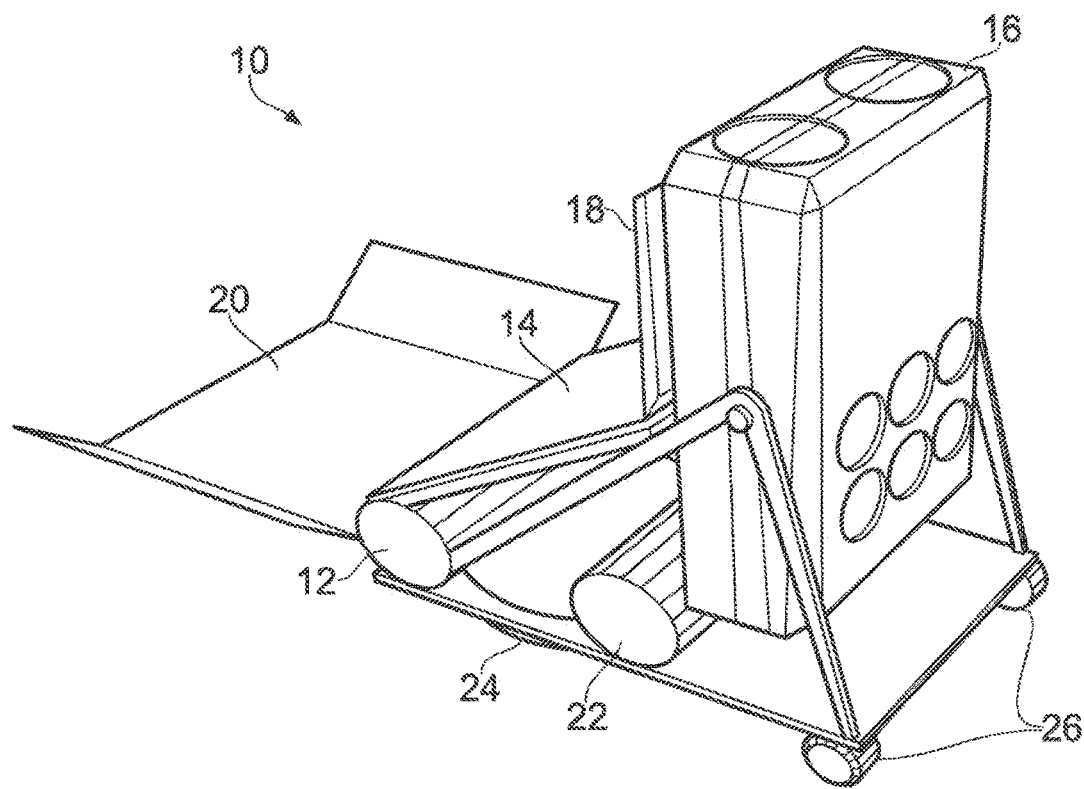
FIG. 3 is a further perspective view of the embodiment of FIG. 2.

FIGS. 2 and 3 show a first embodiment of the present invention in an expanded, or 'in-use', configuration. Desalination system 10 comprises a number of components which all work together to achieve solar-powered desalination.

Desalination system 10 comprises a salt water tank 12 into which salt water is provided in use. The salt water tank 12 is in fluid communication, via water inlet pipe 13, with a solar collector 14 and a first pump (not shown) is located between salt water tank 12 and solar collector 14 to facilitate controlled delivery of salt water into the solar collector 14.

The solar collector 14 comprises a sealed panel 50 with an extended planar surface 52 for exposure to the sun's rays and, in use, the extended planar surface of the solar collector 14 is arranged at an angle to maximise exposure to the sun and allow maximum absorption of the sun's heat.

The extended planar surface 52 is transparent and comprises any suitable plastics material.

Figure 6:
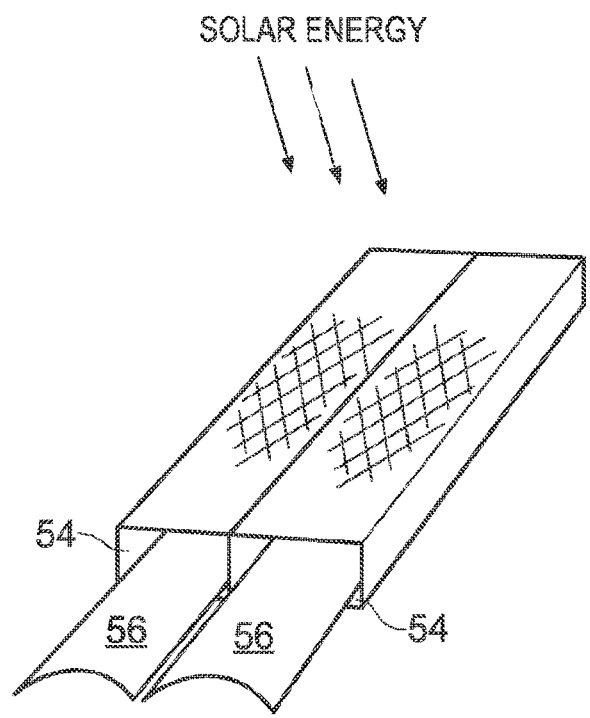
FIG. 6 shows a small section of the solar collector of the embodiment of FIG. 2.

FIG. 6 shows a small section of the panel 50 showing only two of the cavities 54 for receiving salt water. Each cavity 54 includes metallic inserts 56. The metallic inserts 56 may be painted black in order to reduce reflection. The metallic inserts 56 comprise highly conductive material such as, but not restricted to, any suitable metal with a low thermal mass. This helps facilitate efficient and instant thermal energy exchange with the water.

Figure 7:
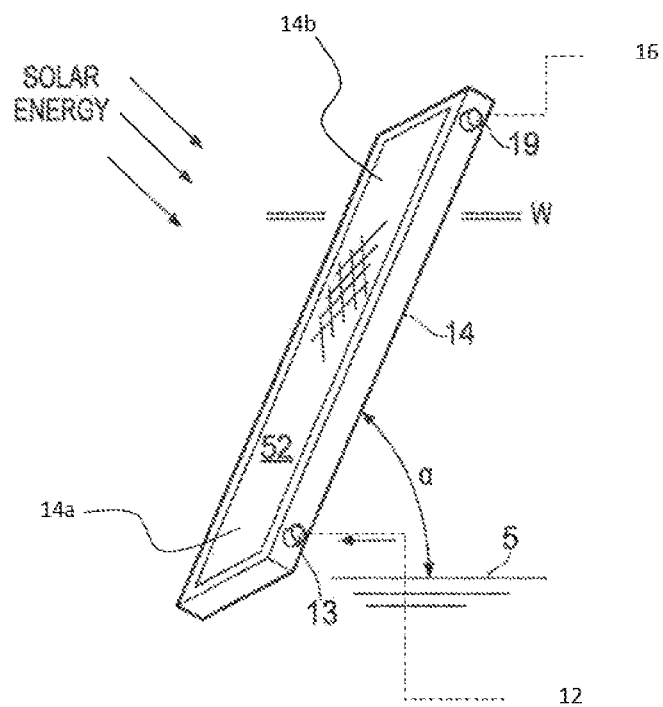
FIG. 7 is a further representation of the solar collector of the embodiment of FIG. 2.

FIG. 7 shows the position of solar collector 14 with respect to the surface 5 on which it is resting, for example, the ground. Internally the solar collector 14 is divided into a first lower portion 14a which receives salt water from salt water tank 12 and a second upper portion 14b for receiving water vapour. Lower portion 14a has a salt water inlet pipe 13, and upper portion 14b has an air inlet 15 linking it to the lower portion 14a, and a vapour outlet 19 linking the upper portion 14b of solar collector 14 to water a condenser 16.

The angle α is determined with respect to the sun in order to maximise the heat absorption by solar collector 14. However, it will be appreciated that this angle must be greater than zero to avoid salt water flowing into condenser 16. The division line between water and air/water vapour within the solar collector 14 is indicated by figure reference W. As can be seen, approximately 85% of the volume comprises water.

Figure 8:
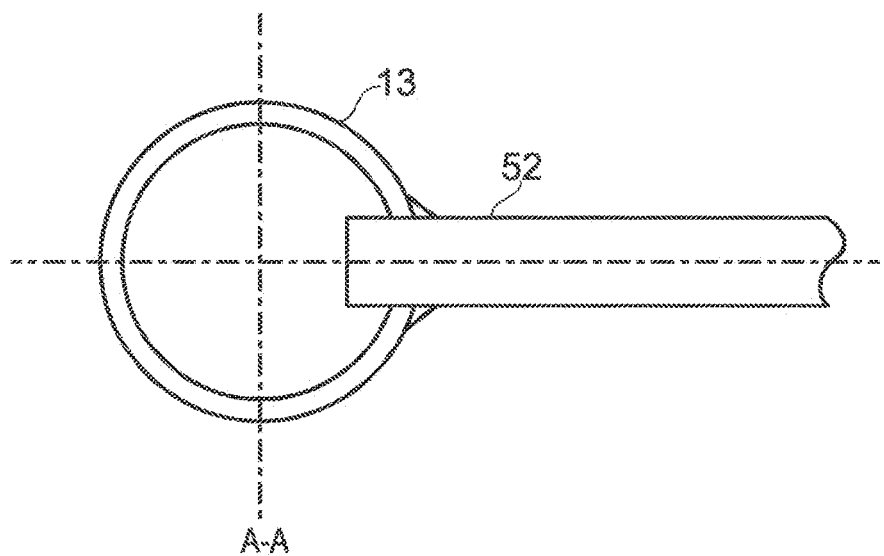
FIG. 8 is a cross-sectional view through the solar collector water inlet pipe of the embodiment of FIG. 2.

FIG. 8 is a cross-sectional view through the water inlet pipe 13, showing that the transparent plastic surface 52 extends into the water inlet pipe 13. Temperature detector 30 is located within water inlet pipe 13, close to the cavities 54 and to the water inlet 13a of panel 50.

Figure 9:
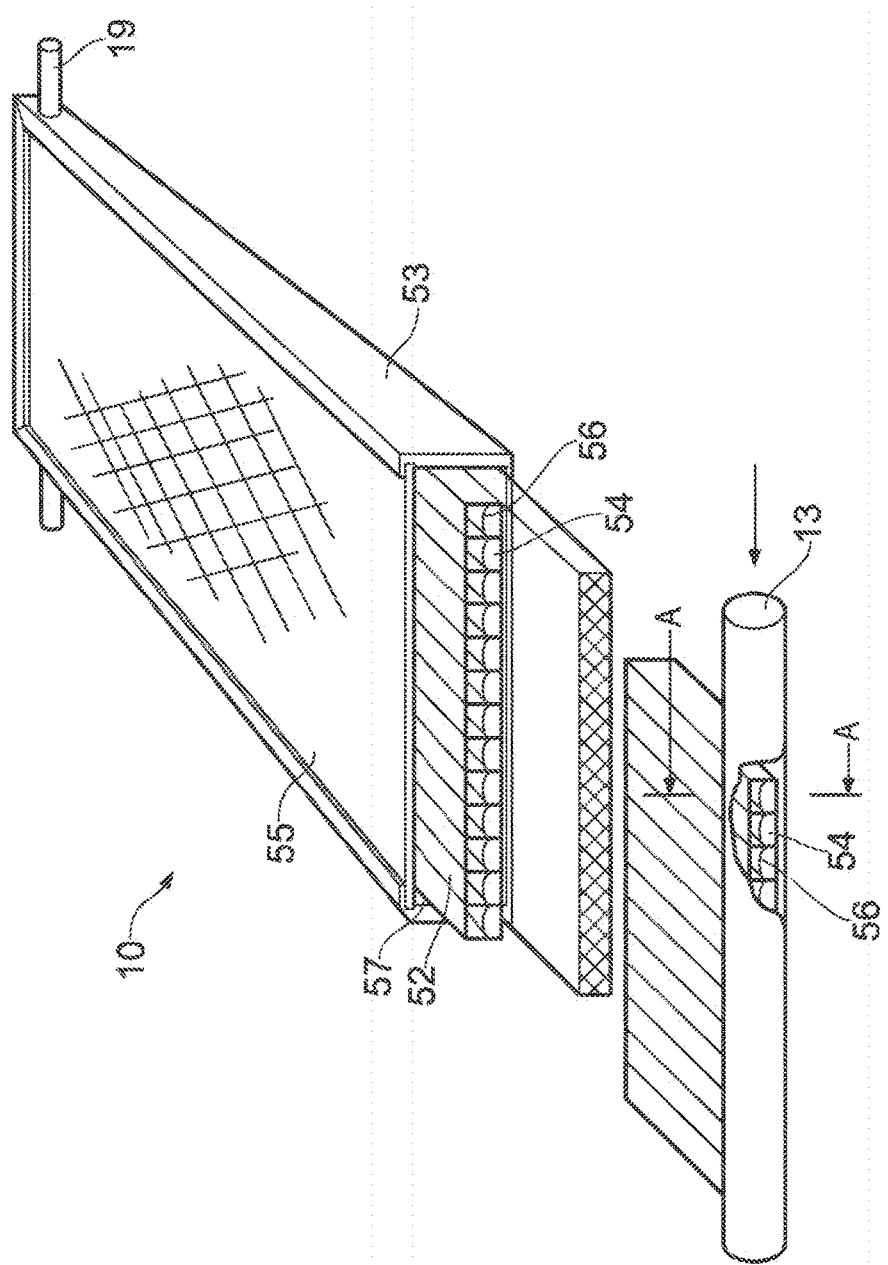
FIG. 9 is a partially exploded diagrammatic representation of the embodiment of FIG. 2.

As can be seen from FIG. 9, the substantially planar surface 52 of solar collector 14 comprises an outer packaging layer 53 comprising any suitable durable plastic material. The outer packaging layer includes a transparent cover 55. An air gap 57 is present between cover 55 and extended planar surface 52. Internally, the solar collector 14 comprises a plurality of cavities 54, each cavity containing a metallic insert 56. A further insulating layer 62 is also provided. Section A-A corresponds to cross-section A-A of FIG. 8. Also, the partial section shown in water inlet pipe 13 indicates the approximate location of temperature detector 30.

It can be seen from FIGS. 8 and 9 that the extended (transparent) planar surface 52 of solar collector 14 extends substantially into the interior of water inlet pipe 13. This reduces heat losses and facilitates the smooth flow of salt water from the salt water tank 12 to the solar collector 14.

In use, salt water is dripped onto metallic inserts 56 and vapourised during operation of the desalination system 10. The metallic insert 56 (or hot plate) is a single 1mm thick metallic plate. However, it will be appreciated that metallic inserts 56 may alternatively comprise metal strips/tubes coloured black.

The desalination system 10 is also provided with a clean water tank 22 in fluid communication with water condenser 16 to collect clean condensed water from the water condenser 16 via vapour outlet 17. A second pump (not shown) is provided to pump clean water out of the water condenser 16 into the clean water tank 22. However, it is to be understood that although the embodiment shown includes a clean water tank 22, other embodiments may have a clean water outlet through which water can be collected in a non-integral container or tank. Or, alternatively, water may exit the water condenser 16 via a suitable conduit such a pipe, tubing or other suitable means to transport the clean water to a remote point of collection or use.

The water condenser 16 has an outer surface comprising a white plastic material in order to limit the absorption of sun's rays by the surface of the water condenser 16 and minimise the heating of the water condenser 16 by the sun's rays.

A photovoltaic (PV) panel 18 is provided to absorb solar energy and convert it to electrical energy which is supplied to a batter pack 32 and used to power the electronic components of the system (i.e. pumps, sensors, micro-controller). A micro-controller 28 (not shown) is provided in electrical communication with the electrical components of the desalination system 10 and is operable to control their activity.

Figure 4:
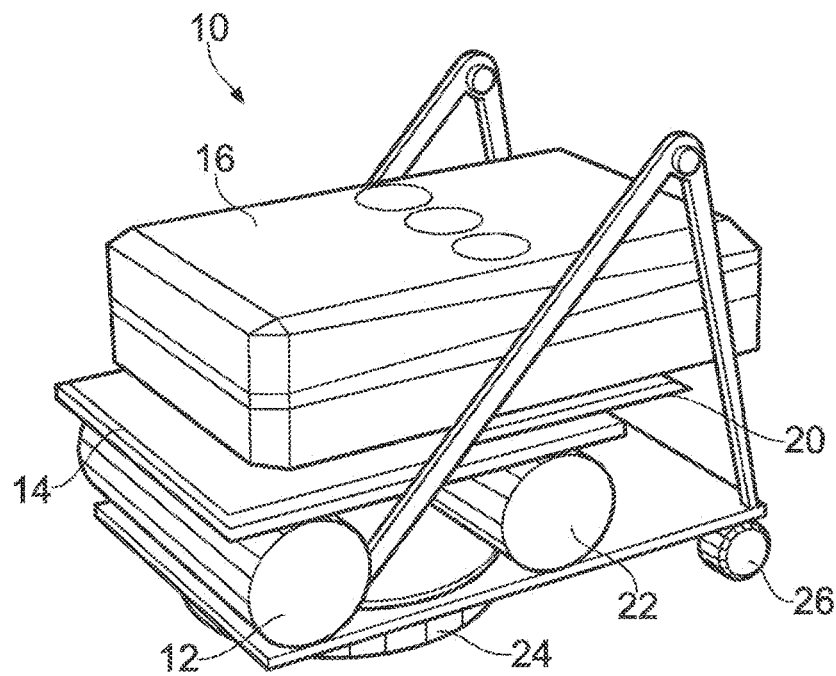
FIG. 4 is a perspective view of the embodiment of FIGS. 2 and 3 in a folded configuration for storage.

Also provided is solar reflector 20, which is located adjacent solar collector 14 and positioned to reflect solar rays towards solar collector 14, thereby increasing the solar energy intensity on the solar collector 14. The solar reflector 20 is foldable relative to the solar collector 14, as shown in FIG. 4. When in the folded configuration, the surface of the solar reflector 20 that is exposed to solar rays in use, lies adjacent the surface of the solar collector 14 that is exposed to solar rays in use. The surfaces of solar reflector 20 and solar collector 14 are thereby protected when in the folded configuration, shielding them from damage during storage or transportation/relocation.

The solar reflector 14 has a polished metallic surface to maximise its reflective qualities.

Desalination system 10 is mounted (at least in part) on a movable platform 24. In the embodiment shown the movable platform 24 takes the form of a turntable and is rotatable about a vertical axis such that the solar collector 14 can be moved to track the movement of the sun across the sky throughout the day. However, it is to be appreciated that any suitable movable platform 24 may be employed provided it allows the solar collector to be moved in alignment with the sun's rays.

Photodetectors are provided (not shown) on each sides of the face of the PV panel 18 that is receiving the sun's radiation. to detect the levels of solar energy and generate a solar energy signal indicative of the solar energy level, and to supply such a solar energy signal to the micro-controller 28. They are small and can be embedded in the panel frame.

The desalination system has a number of sensors (not shown) which detect various events and transmit signals to the controller. A first sensor is located in the water condenser 16 and is operable to transmit a signal to the controller on detection of condensed water. A second sensor (not shown) is located in the clean water tank and operable to transmit a signal to the controller on detection of the clean water rising above a predetermined level. A third sensor (not shown) is located in the salt water tank and operable to transmit a signal to the controller on detection of the salt water level dropping below a predetermined level. As mentioned earlier, a temperature detector 30 is provided which is operable to generate a temperature signal indicative of the temperature of the metallic inserts 56 within the solar collector 14.

Figure 5:
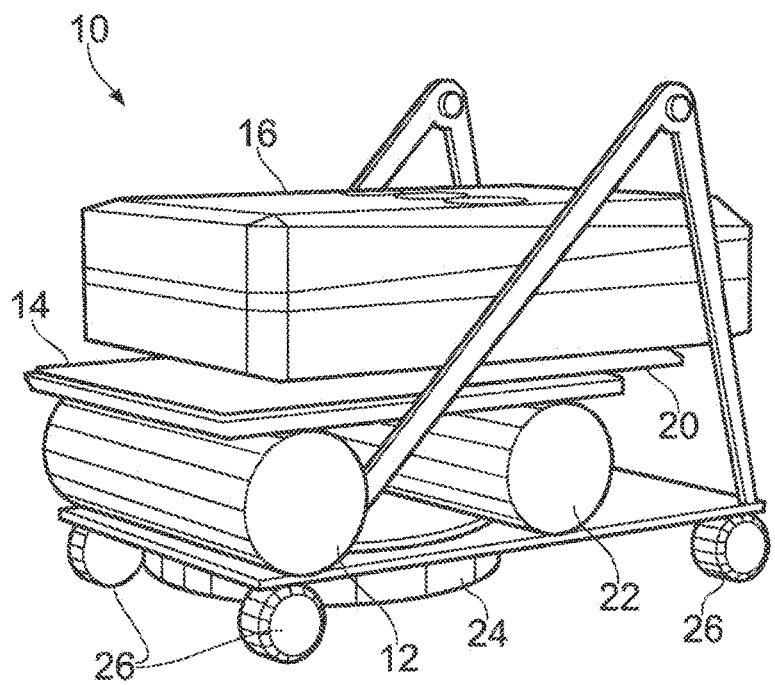
FIG. 5 is a perspective view of the embodiment of FIG. 4 with mobility wheels fitted to assist with transportation.

As shown in FIG. 5, mobility wheels 26 may be provided in order to easily move the desalination system 10, when in the folded configuration, to another location. Alternatively, the desalination system 10 may be dismantled into its component parts, packed, transported, and reassembled at a new location. The latter arrangement may be more suitable where the desalination system 10 is to be transported some distance, perhaps by air or ship, in order to minimise size and maximise protection of the component parts during transit.

The desalination system 10 is used in the unfolded configuration i.e. with the solar reflector 20 unfolded from the solar collector 14, as shown in FIG. 2. The photovoltaic panel 18 is positioned to convert incident solar energy to electrical energy which is then supplied via electrical connections to battery pack 32, where it is stored for use as a back-up power source when needed to power the electrical components of the desalination system 10, for example when there is insufficient electrical energy being generated by the photovoltaic panel 18 or on initialisation of the desalination system 10 or when the desalination system 10 is in stand-by mode.

The photodetectors (not shown) adjacent the solar collector 14 generate a solar energy signal indicative of the detected solar energy at their location and supply such solar signals to the micro-controller 28. The micro-controller 28 receives the solar energy signals from the photodetectors, determines what the best position is for maximum exposure of the solar collector 14 to the sun's rays and communicates with the movable platform 24 to orient the solar collector 14 to assume that best position. This process will be repeated at predetermined periods in time throughout the operation of the desalination system 10 to ensure that the solar collector 14 tracks the movement of the sun and continues to experience maximum exposure to the sun's rays. The solar reflector 20 is in a fixed position relative to the solar collector 14 and directs solar rays onto the solar collector 14 to increase the intensity of the solar energy at the solar collector 14. This results in an increase in temperature at the metallic inserts 56 of the solar collector 14.

When the temperature at the metallic inserts 50 of the solar collector 14 reach 90° C., the temperature detector 30 at the surface of metallic inserts 50 of the solar collector 14 generates a signal indicating that the temperature of the metallic inserts 50 of the solar collector 14 have reached the predetermined temperature and supply the signal to the micro-controller 28. On receipt of such a signal, the micro-controller 28 generates and sends a signal to the first pump to pump salt water from the salt water tank 12 into the solar collector 14 in a controlled manner and at a predetermined flow rate. The flow rate depends on the sun's radiation and the weather conditions, the size of the solar collector, and the energy extraction rate of the desalination system. When salt water is dripped onto the metallic inserts 56 of the solar collector, it is rapidly heated and vapourises leaving salt behind on the metallic inserts 56. The water vapour rises and enters the water condenser 16.

The water condenser 16 is provided with a plurality of cold plates which are cooled by means of several fans 34, typically 3 to 6 fans working together. The number of fans 34 required is determined and controlled by micro-controller 28.

When the water vapour enters the water condenser 16, it condenses on the fan-cooled plates and drops to the bottom of the water condenser 16. The first sensor, located in the water condenser 16 detects the condensed water once the water level rises to a predetermined level. On detection of condensed water, the first sensor generates and supplies a signal to the micro-processor which responds by switching on the second pump 36. The second pump 36 pumps the condensed water from the water condenser 16 to the clean water tank 22.

A second sensor (not shown) is located in the clean water tank and positioned to detect when the clean water level rises above a predetermined level. On detection of the clean water rising above the predetermined level, the second sensor generates and supplies a signal to the micro-processor which responds by switching off first and second pumps, effectively halting further desalination of the salt water until the clean water tank has been emptied and the clean water level drops below the predetermined level.

A third sensor (not shown) is located in the salt water tank and positioned to detect when the salt water level drops below a predetermined level. On detection of the salt water level dropping below the predetermined level, the third sensor generates and supplied a signal to the micro-processor which respond by switching off the first pump to prevent it running dry. On replenishment of the salt water tank such that the salt water level is no longer below the predetermined level, the controller will switch the first pump on again so that supply of salt water to the solar connector 14 can recommence.

The desalination process will continue until the temperature detected at the metallic inserts 56 of the solar collector 14 falls below the predetermined temperature, in this case 90° C. in which case the temperature signal generated by the temperature detector 30 and supplied to the micro-controller 28 will indicate that the temperature at the metallic inserts 50 has fallen below the predetermined level. The micro-controller 28 will respond by switching off the first pump (thereby stopping the supply of salt water to the solar collector 14) and shutting down the desalination system 10.

The desalination system 10 may also be shut down if the output of the photovoltaic panel 18 falls below a predetermined level as this will indicate that the solar energy availability has dropped below that required to successfully operate the system and heat the plates in the solar collector 14 to the predetermined temperature.

The salt retained in the solar collector 14 can be removed periodically as it builds up. Cleaning out accumulated salt will typically be necessary once a week if the desalination system 10 is used daily. There are various methods by which the salt may be extracted from the solar collector 14 including, but not limited to, a turned auger or a removable cell. The salt represents a valuable resource for use in other applications.

EXAMPLE

The data for an example of the present invention is shown below:

| Parameter | Value |
| --- | --- |
| Area of collector | 2 m$^2$ |
| Maximum solar power of collector | 2 kW |
| Water volume of collector | 5 liters |
| Salt content of source water by volume | 5% |
| Temperature of source water | 25° C. |
| Temperature increase requirement | 76° C. |

It requires 1 kCal of energy to raise the temperature of 1 litre of water by 1 deg. C. Thus, considering that 1000 kCal=1.163 kWh, the 2 kW example of the invention provides 1720 kCal of energy per hour.

The volume of saline water that can be evaporated per hour is thus 1720/76=22.5 litres per hour.

The electrical energy requirements for the example of the invention are estimated here:

| ELECTRICAL COMPONENT | POWER |
| --- | --- |
| 0.3 A, 12 V water pump for driving water through collector | 3.6 W |

-continued

| ELECTRICAL COMPONENT | POWER | |
|---|---|---|
| A small 12 volt portable | 0.3 A, 12 V pump to collect the condensed water | 3.6 W |
| | 0.5 A 12 V cooling fans (6 No.) | 36.0 W |
| | 0.5 A 12 V panel positioning motor | 6.0 W |
| | 0.3 A 12 V control panel | 3.6 W |
| | TOTAL POWER REQUIREMENT | 52.8 W | photovoltaic panel may be used to provide the electrical energy required by the desalination system 10. Alternatively, a 12 volt rechargeable battery may be used, typically providing 12-24 hours of sufficient power between charging.

In this example, the 12 volt electrical requirement is 0.0528 kWh for 22.3 litres of water condensate.

The source of energy for evaporation in this invention is the sun. Therefore, the production of the fresh water and energy will directly depend on the provision of solar radiation. The process may be slower than currently exploited technologies. However, these currently exploited technologies require huge energy inputs for water evaporation, which is not practical for mobile desalination units for use in remote areas and disadvantaged communities. Whereas, the present invention exploits a natural process and can be deployed in any location.

Although aspects of the invention have been described with reference to the embodiment shown in the accompanying drawings, it is to be understood that the invention is not limited to the precise embodiment shown and that various changes and modifications may be effected without further inventive skill and effort, for example, the microcontroller may be used to accumulate statistical data and be enabled to detect and recognize shadows from passing objects, for example, aircraft, and ignore them, thus avoiding false shut-down of the desalination system 10 caused by momentary reduced output from the photovoltaic panel.

The invention claimed is:

1. A desalination system comprising:
 a controller;
 a salt water tank operable to receive salt water therein;
 a solar collector in fluid communication with the salt water tank and adapted to receive salt water therein through a water inlet pipe on a lower portion of the solar collector, wherein the solar collector extends into the water inlet pipe;
 a first pump operable to pump salt water from the salt water tank into the solar collector;
 a photovoltaic (PV) panel operable to convert incident solar energy to electrical energy, and operable to supply electrical energy to the first pump;
 a water condenser tank in fluid communication with the first pump and arranged to receive water vapour from the solar collector through a vapour outlet on an upper portion of the solar collector and to condense such received water vapour; and
 a temperature detector operable to measure the temperature of plates of the solar collector and generate a temperature signal indicative of said temperature of the plates of the solar collector, and to supply the temperature signal to the controller,
 wherein the controller is arranged to receive the temperature signal from the temperature detector, and is operable to control the first pump in dependence upon the temperature signal, such that the first pump operates to transfer salt water from the salt water tank to the solar collector only when the temperature signal is indicative of a predetermined temperature at the plates of the solar collector of 90° C. or above, and does not operate to transfer salt water to the solar collector when the temperature signal drops below the predetermined temperature.

2. A desalination system as claimed in claim 1, further provided with a clean water tank in fluid communication with the water condenser tank and operable to collect condensed water therefrom.

3. A desalination system as claimed in claim 2, further provided with a second pump in fluid communication with the water condenser tank and the clean water tank and operable to pump water from the water condenser tank to the clean water tank on receipt of a signal from the controller.

4. A desalination system according to claim 3, further comprising a first sensor located in the water condenser tank and operable to transmit a signal to the controller on detection of water.

5. A desalination system according to claim 4, wherein on receipt of a signal from the first sensor, the controller is operable to transmit a signal to the second pump to pump clean water from the water condenser tank to the clean water tank.

6. A desalination system as claimed in claim 1, further comprising a reflector operable to direct solar rays onto the solar collector.

7. A desalination system as claimed in claim 6 wherein the reflector and solar collector are pivotable relative to one another between a first folded configuration and a second expanded configuration.

8. A desalination system as claimed in claim 7, wherein, in the second expanded configuration the reflector and solar collector are arranged in a fixed position relative to one another to maximise a reflection of solar rays by the reflector onto a surface of the solar collector.

9. A desalination system as claimed in claim 1, wherein the solar collector is mounted on a movable platform.

10. A desalination system as claimed in claim 9, wherein the moveable platform is operable to move the solar collector about a vertical axis.

11. A desalination system as claimed in claim 9, further comprising a plurality of photodetectors operable to generate a solar energy signal indicative of solar energy, and to supply such a solar energy signal to the controller, wherein the controller is arranged to receive solar energy signals from the photodetectors and is operable to control the movable platform in dependence upon such a received solar energy signals, such that the movable platform is operable to move the solar collector about a vertical axis.

12. A desalination system as claimed in claim 11, wherein on receipt of solar energy signals from the photodetectors, the controller is operable to calculate an optimum position for the solar collector and is operable to control the movable platform in dependence upon the optimum position, such that the moveable platform is operable to move the solar collector about the vertical axis to a position corresponding to the optimum position.

13. A desalination system as claimed in claim 12, wherein the controller is operable at preselected time intervals to receive solar energy signals from the photodetectors and calculate a new optimum position for the solar collector and is operable to control the moveable platform in dependence upon the new optimum position such that the moveable platform is operable to move the solar collector about the vertical axis to a position corresponding to the new optimum position.

14. A desalination system as claimed in claim 4, further provided with a second sensor located in the clean water tank and operable to transmit a signal to the controller on detection of the clean water rising above a predetermined level.

15. A desalination system as claimed in claim 14, further provided with a third sensor located in the salt water tank and operable to transmit a signal to the controller on detection of a level of the salt water dropping below a predetermined level.

16. A desalination system as claimed in claim 15, wherein on detection of a signal from one or both of the second or third sensors, the controller is operable to transmit a signal to the first and second pumps to cease operating.

17. A desalination system as claimed in claim 1, wherein the solar collector comprises a sealed panel with a planar surface.

18. A desalination system as claimed in claim 17, wherein the sealed panel is sealed within an outer packaging layer, the outer packaging layer comprising a transparent cover.

19. A desalination system as claimed in claim 1, wherein the solar collector comprises a plurality of cavities, at least one cavity of the plurality of cavities comprising a metallic insert.

\* \* \* \* \*